US011282277B1

(12) United States Patent
Phogat et al.

(10) Patent No.: US 11,282,277 B1
(45) Date of Patent: Mar. 22, 2022

(54) SYSTEMS FOR SHADING VECTOR OBJECTS

(71) Applicant: Adobe Inc., San Jose, CA (US)

(72) Inventors: Ankit Phogat, Noida (IN); Vineet Batra, Pitam Pura (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/034,892

(22) Filed: Sep. 28, 2020

(51) Int. Cl.
*G06T 17/20* (2006.01)
*G06T 15/00* (2011.01)
*G06T 15/50* (2011.01)

(52) U.S. Cl.
CPC .......... *G06T 17/205* (2013.01); *G06T 15/005* (2013.01); *G06T 15/503* (2013.01); *G06T 2200/24* (2013.01)

(58) Field of Classification Search
CPC ... G06T 17/205; G06T 15/503; G06T 15/005; G06T 2200/24
See application file for complete search history.

(56) References Cited

U.S. PATENT DOCUMENTS

| | | | | |
|---|---|---|---|---|
| 9,454,797 | B2* | 9/2016 | Popovic | G06T 3/0093 |
| 10,043,233 | B1* | 8/2018 | Ben | G06T 1/20 |
| 2009/0231337 | A1* | 9/2009 | Carr | G06T 17/10 |
| | | | | 345/423 |
| 2011/0043523 | A1* | 2/2011 | Kim | G06T 15/506 |
| | | | | 345/426 |
| 2013/0127856 | A1* | 5/2013 | Winnemoeller | G06T 11/001 |
| | | | | 345/423 |
| 2018/0122138 | A1* | 5/2018 | Piya | G06T 19/20 |
| 2019/0087980 | A1* | 3/2019 | Phogat | G06T 11/001 |
| 2020/0005537 | A1* | 1/2020 | Inagaki | G06T 13/20 |
| 2020/0297457 | A1* | 9/2020 | Shah | A61C 7/08 |

OTHER PUBLICATIONS

Lieng, Henrik, "Shading Curves: Vector-Based Drawing With Explicit Gradient Control", Computer Graphics Forum. vol. 34. No. 6, [retrieved Oct. 13, 2020], pp. 228-239. (Year: 2015).*
Yuille, A.L., "Lecture10: The Lambertian Reflectance Model", Retrieved on Nov. 3, 2020., Feb. 18, 2012, 7pages. (Year: 2012).*
"Lambertian reflectance", Wikipedia [retrieved Nov. 3, 2020], Retrieved from the Internet <https://en.rn.wikipedia.org/wiki/Lambertian_reflectance>., Nov. 2020, 3 pages.

(Continued)

*Primary Examiner* — Michael Le
(74) *Attorney, Agent, or Firm* — FIG. 1 Patents

(57) ABSTRACT

In implementations of systems for shading vector objects, a computing device implements a shading system which detects points along a boundary of a vector-based object. The shading system forms a two-dimensional mesh based on the detected points. The shading system generates a three-dimensional mesh by inflating the two-dimensional mesh based on a geometry of the vector-based object. Color values are applied to a shading mesh based on locations of vertices of the three-dimensional mesh. The shading system generates a shaded vector-based object by blending the vector-based object and the shading mesh.

20 Claims, 11 Drawing Sheets
(8 of 11 Drawing Sheet(s) Filed in Color)

(56) References Cited

OTHER PUBLICATIONS

"PDF Blend Modes: Addendum", Adobe.com [retrieved Oct. 13, 2020], Retrieved from the Internet <https://www.adobe.com/content/dam/acom/en/devnet/pdf/pdf_reference_archive/blend_modes.pdf>., Jan. 23, 2006, 6 pages.

Cloud, Shao et al., "CrossShade: Shading Concept Sketches Using Cross-Section Curves", ACM Transactions on Graphics, Association for Computing Machinery, 2012, Proceedings of SIGGRAPH, 31 (4), [retrieved Oct. 13, 2020], Retrieved from the Internet <https://hal.inria.fr/file/index/docid/703202/filename/paper.pdf>., Jun. 2, 2012, 12 pages.

Jacobson, Alec et al., "Bounded Biharmonic Weights for Real-Time Deformation", In ACM SIGGRAPH 2011 Papers, SIGGRAPH '11 [retrieved on Oct. 13, 2020], Retrieved from the Internet <https://igl.ethz.ch/projects/bbw/bounded-biharmonic-weights-siggraph-2011-compressed-jacobson-et-al.pdf>., Jul. 2011, 8 pages.

Koppal, Sanjeev J., "Lambertian Reflectance", In: Ikeuchi K. (eds) Computer Vision. Springer, Boston, MA, Jan. 1, 2014, pp. 441-443.

Lieng, Henrik, "Shading Curves: Vector-Based Drawing With Explicit Gradient Control", Computer Graphics Forum. vol. 34. No. 6. [retrieved Oct. 13, 2020], Retrieved from the Internet <https://core.ac.uk/download/pdf/77407334.pdf>., Feb. 23, 2015, pp. 228-239.

Shewchuk, Jonathan R., "Triangle: Engineering a 2D Quality Mesh Generator and Delaunay Triangulator", Workshop on Applied Computational Geometry. Springer, Berlin [retrieved Oct. 13, 2020], Retrieved from the Internet <shorturl.at/egsyX>., May 1996, 10 pages.

Yuille, A.L., "Lecture 10: The Lambertian Reflectance Model", Retrieved on Nov. 3, 2020. Retrieved from the Internet <http://www.cs.jhu.edu/~ayuille/courses/Stat238-Winter12/lecture10.pdf>., Feb. 18, 2012, 7 pages.

* cited by examiner

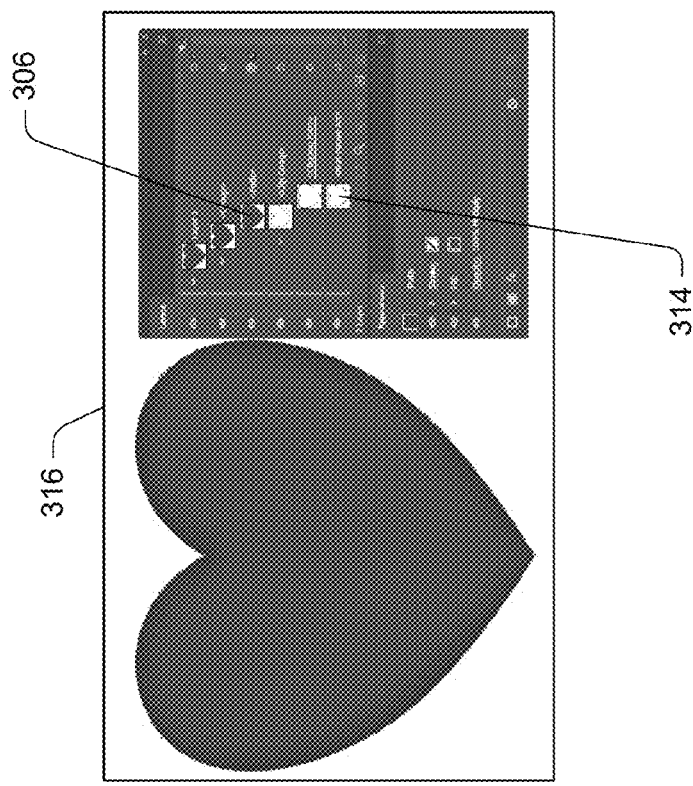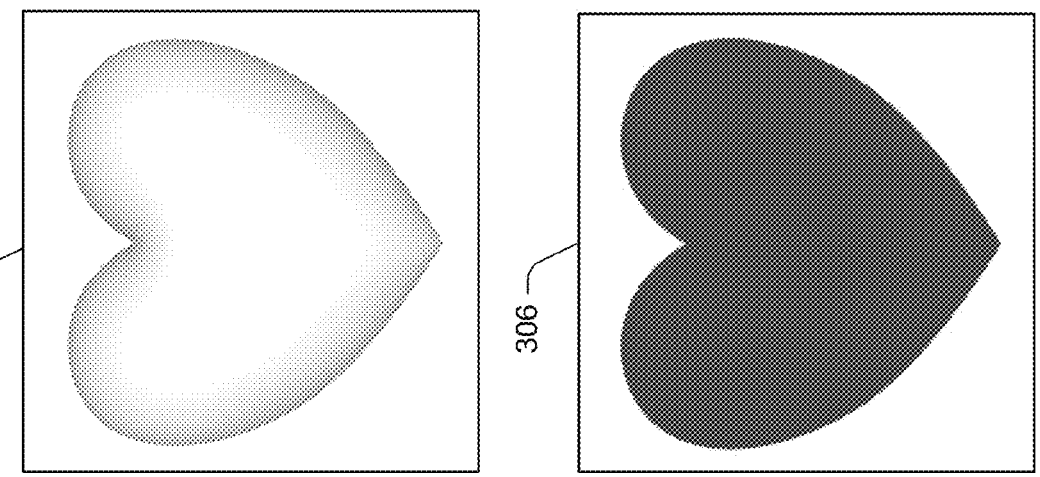
Fig. 3B

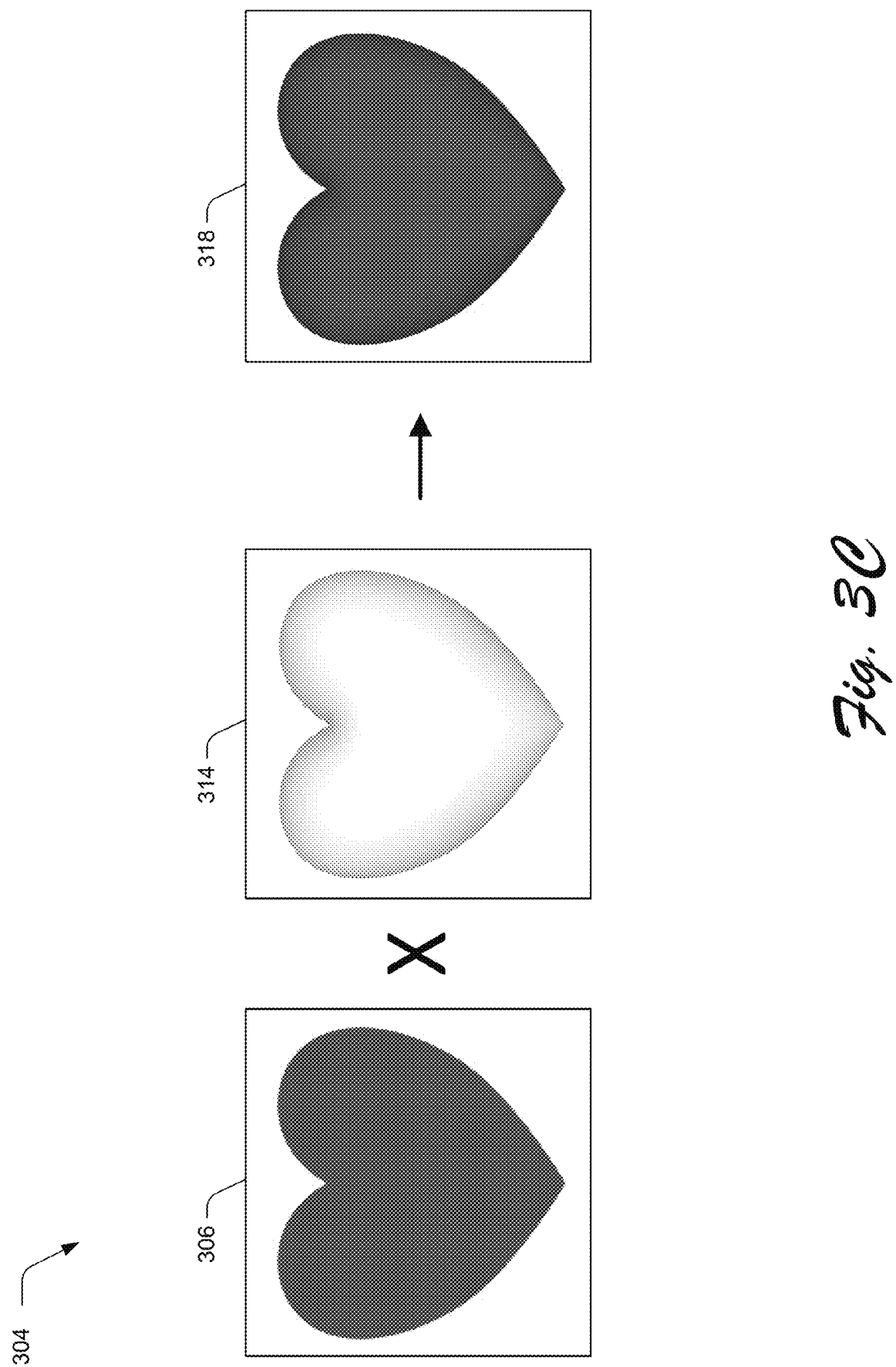

400

402
Detect points along a boundary of a vector-based object

404
Form a two-dimensional mesh based on the detected points

406
Determine a geometry of the vector-based object

408
Generate a three-dimensional mesh by inflating the two-dimensional mesh based on the geometry of the vector-based object

410
Apply color values to a shading mesh based on locations of vertices of the three-dimensional mesh

*Fig. 4*

SYSTEMS FOR SHADING VECTOR OBJECTS

BACKGROUND

Vector graphics have several advantages over raster graphics such as compact representation and resolution independence. This is because vector objects are defined as points, lines, and/or curves whereas raster objects are defined as arrays of pixels. For example, points, lines, and curves are describable using a relatively small amount of data compared an amount of data needed to describe an array of bits for each pixel included in an array of pixels. Since vector-based graphics are not defined based on any particular resolution, vector graphics may be scaled up or down without the negative effects of aliasing which are observable when scaling raster-based graphics.

Due to the advantages of vector graphics, vector objects are frequently included in digital artwork, online digital content, and in digital content which is likely to be resized or scaled such as logos, icons, labels, and so forth. Vector objects are also commonly included as part of digital content in scenarios in which it is desirable to improve aesthetics of the vector objects through use of lighting and shadows. For example, shading the vector objects in this manner adds a degree of realism to the digital content.

Conventional systems for automatically shading vector objects, for example, without user intervention, generate an appearance of light and shadows by converting the vector objects to raster objects. These systems apply shading to the raster objects by determining color values for pixels on a per-pixel basis. For example, a conventional system for automatically shading a vector object receives the vector object as an input and outputs a shaded raster object. This shaded raster object no longer has the desirable vector-based properties such as compact representation and resolution independence.

SUMMARY

To overcome the disadvantages of conventional systems, systems and techniques are described for shading vector objects, for example, automatically and without user intervention. In an example, a computing device implements a shading system to detect points along a boundary of a vector-based object. For example, the shading system uses the detected points to form a two-dimensional mesh.

The shading system generates a three-dimensional mesh by inflating the two-dimensional mesh based on a geometry of the vector-based object in one example. The shading system determines color values based on locations of vertices of the three-dimensional mesh and applies the color values to a shading mesh. For example, the shading system generates a shaded vector-based object by blending the vector-based object and the shading mesh.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIGS. 3A, 3B, and 3C illustrate example representations of shading a vector object.

FIG. 4 is a flow diagram depicting a procedure in an example implementation in which a three-dimensional mesh is generated by inflating a two-dimensional mesh and color values are applied to a shading mesh based on locations of vertices of the three-dimensional mesh.

DETAILED DESCRIPTION

Overview

Figure 1:
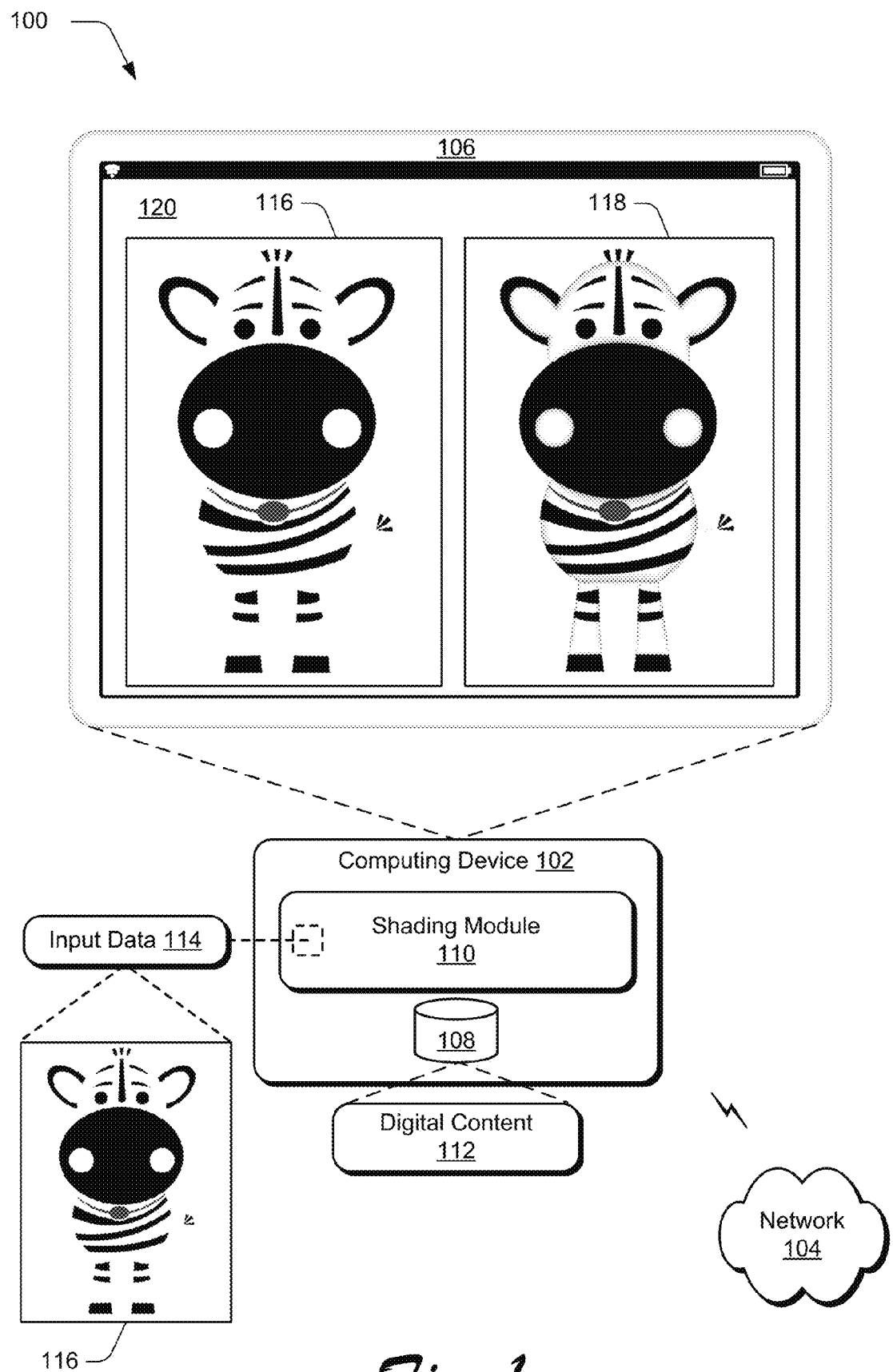
FIG. 1 is an illustration of an environment in an example implementation that is operable to employ digital systems and techniques for shading vector objects as described herein.

Vector graphics have several advantages over raster graphics which include resolution independence as well compact representation in the form of points, lines, curves, colors, and/or thicknesses. As a result of these advantages, vector objects are frequently included as part of digital content in scenarios in which it is desirable to use light and shadows to improve a visual appearance of the vector objects. Conventional systems for automatically shading vector objects generate an appearance of light and shadows by converting the vector objects to raster objects and generating shaded raster objects. These shaded raster objects no longer have the desirable vector-based properties such as compact representation and resolution independence.

In order to overcome the limitations of conventional systems, systems and techniques are described for shading vector objects, for example, automatically and without user intervention. In one example, a computing device implements a shading system to receive input data describing a vector-based object. The shading system processes the input data and detects points along a boundary of the vector-based object. For example, the shading system forms a two-dimensional mesh based on the detected points.

In an example, the shading system uses the detected points to triangulate an interior of a geometry of the vector-based object and forms the two-dimensional mesh as a triangle mesh. In another example, the shading system smooths the two-dimensional mesh to minimize Laplacian energy by using a biharmonic equation subject to a condition that values of boundary vertices of the two-dimensional mesh remain the same in the smoothed two-dimensional mesh. The shading system generates a three-dimensional mesh by inflating the two-dimensional mesh based on the geometry of the vector-based object.

For example, the shading system computes a height field which includes a z-value for each vertex of the two-dimensional mesh. In one example, the shading system ensures variation of the z-values across vertices of the two-dimensional mesh to facilitate barycentric interpolation. The two-dimensional mesh is inflated using this height field to generate the three-dimensional mesh.

The three-dimensional mesh is usable to generate visual features such as lighting features and shadow features. For example, the shading system simulates a light source as part of a lighting model such as a Lambertian model and uses this light source to project simulated rays of light onto the three-dimensional mesh. By leveraging the lighting model in this way, the shading system determines color values based on locations of vertices of the three-dimensional mesh. These color values correspond to the lighting features and the shadow features in one example.

The shading system applies the color values to a shading mesh and generates a shaded vector-based object by blending (e.g., by multiply blending) the vector-based object and the shading mesh having the applied color values. In one example, the shading mesh is a free-form Gouraud-shaded triangle mesh. For example, the shading system refines a boundary of the shading mesh using the geometry of the vector-based object as a clipping path. In this example, the boundary of the shading mesh is smoothed based on the refinement and the shading system blends the vector-based object and the shading mesh to generate the shaded vector-based object.

In an example, the shading system leverages a transparency group as part of generating the shaded vector-based object. In this example, the shading system adds the vector-based object and the shading mesh to the transparency group. The shading system also transfers original transparency attributes (e.g., opacity and blend mode) of the vector-based object into the transparency group. By including the original transparency attributes in the transparency group in this manner, the shading system ensures that compositing of the vector-based object occurs as it would occur without the addition of the shading.

For example, the shading system generates the shaded vector-based object using the transparency group. The shaded vector-based object retains the properties of a vector object including compact representation and resolution independence. In an example in which the input data describes multiple vector-based objects arranged in a z-order, the shading system generates a shading mesh for each of the multiple vector-based objects and applies shading to these objects in a reverse z-order.

The described systems improve digital content creation technology by generating realistic shading effects and automatically applying these visual features to vector objects as shaded vector objects. This is not possible in conventional systems for automatically shading vector objects which generate lighting and shadow effects by converting the vector objects into raster objects which are no longer resolution independent. The described systems are also capable of generating customized shading for vector objects such as based on user inputs specifying different colors of light, an ambient strength of the light, and/or a diffuse strength of the light.

For example, an amount by which the two-dimensional mesh is inflated to generate the three-dimensional mesh is also customizable. The described systems are also not limited to generation of a three-dimensional representation by inflating a two-dimensional mesh. Rather, the described systems are capable of generating shaded vector objects using any normal map which is usable to map a two-dimensional input to a three-dimensional representation. Because shaded vector-based objects generated by the described systems are PDF compatible, these shaded vector objects are usable in both digital and print workflows in an RGB color space or a CMYK color space which is also not possible in conventional systems.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices, such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and shading module 110. The storage device 108 is illustrated to include digital content 112.

The shading module 110 is illustrated as having, receiving, and/or transmitting input data 114 that describes vector-based objects, and a vector-based object 116 is illustrated to be included in the input data 114. As shown, the vector-based object 116 depicts a zebra with exaggerated and stylized features. Some portions of the zebra appear disconnected from other portions of the zebra. For example, the zebra's legs and tail do not appear to be structurally connected to the zebra's body. This is distracting to a viewer of the vector-based object 116. As a result, the zebra is not visually pleasing.

The computing device 102 implements the shading module 110 to receive the input data 114. The shading module 110 processes the input data 114 and identifies a boundary of the vector-based object 116. For example, the shading module 110 discretizes the boundary and samples points along the boundary which the shading module 110 uses to generate a two-dimensional mesh. In one example, the shading module 110 uses the sampled points to triangulate an interior of a geometry of the vector-based object 116.

The shading module 110 generates a three-dimensional mesh by inflating the two-dimensional mesh (e.g., using harmonic inflation based on the geometry of the vector-based object 116). This three-dimensional mesh is usable to determine color values based on a lighting model such as a Lambertian model. The shading module 110 determines these color values based on locations of vertices of the three-dimensional mesh and applies the color values to a two-dimensional shading mesh. For example, the shading module 110 refines a boundary of the shading mesh using the geometry of the vector-based object 116 as a clipping path.

The shading module 110 composites the vector-based object 116 with the shading mesh (e.g., using a multiply blend operation) to generate a shaded vector-based object 118 which is rendered in a user interface 120 of the display device 106. The vector-based object 116 is also rendered in the user interface 120. As shown, the shaded vector-based object 118 is significantly more aesthetically pleasing than the vector-based object 116. The portions of the zebra which appear disconnected from zebra's body in the vector-based object 116 appear fully connected in the shaded vector-based object 118.

The shaded vector-based object 118 also retains all properties of a vector object and is resolution independent. For example, the shading module 110 receives a vector object as an input and the shading module 110 generates a shaded vector object as an output without converting the vector object to a raster object in this example. In another example, the shading module 110 receives a raster object as an input and generates a shaded raster object as an output. Thus, the shading module 110 is capable of receiving an input object and generating a shaded object regardless of whether the input object is a vector object (e.g., defined by points, lines, and curves) or a raster object (e.g., defined by an array of pixels).

Figure 2:
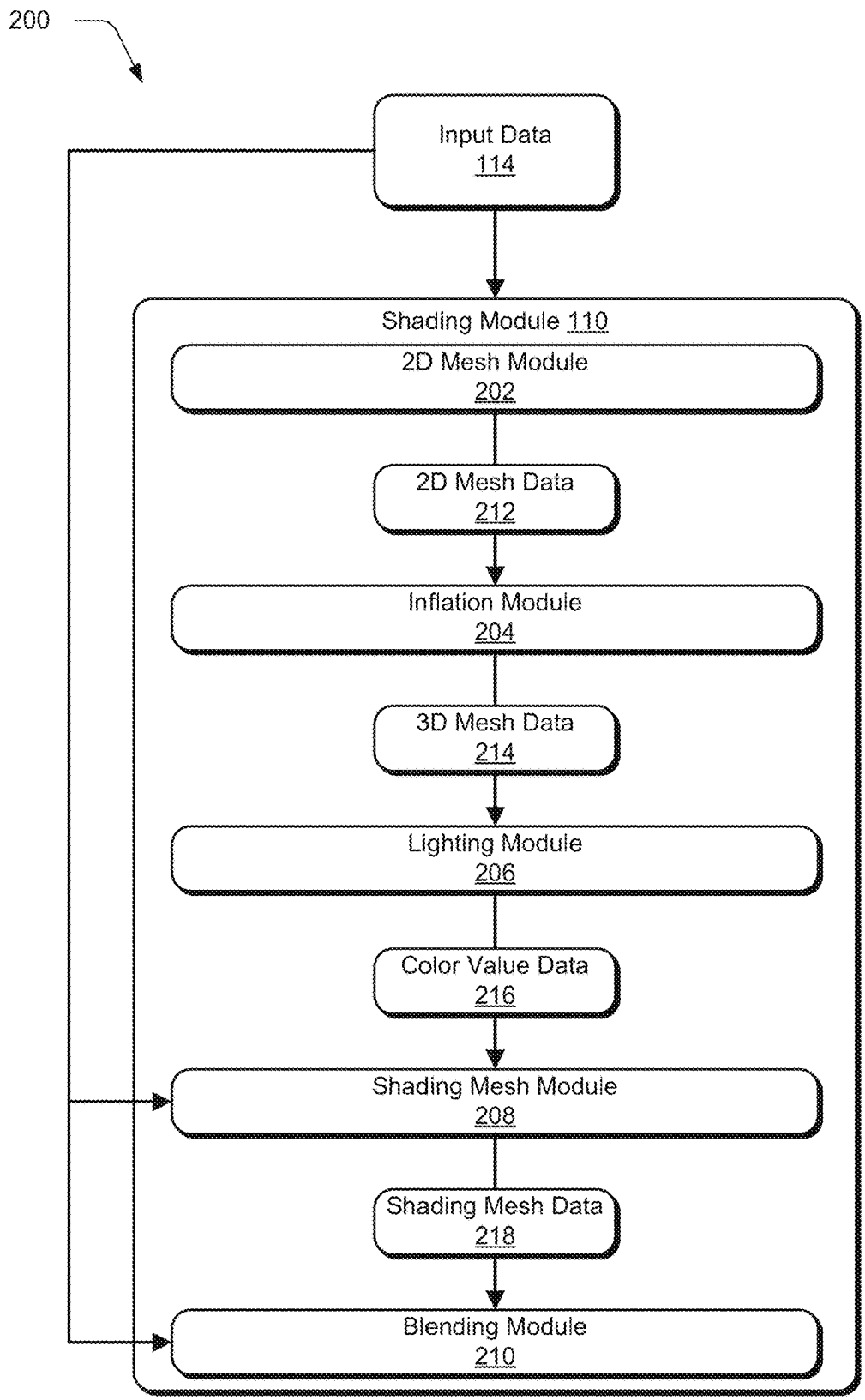
FIG. 2 depicts a system in an example implementation showing operation of a shading module for shading vector objects.

FIG. 2 depicts a system 200 in an example implementation showing operation of a shading module 110. The shading module 110 is illustrated to include a two-dimensional mesh module 202, an inflation module 204, a lighting module 206, a shading mesh module 208, and a blending module 210. The shading module 110 receives the input data 114 which describes vector-based objects such as the vector-based object 116. The two-dimensional mesh module 202 receives and processes the input data 114 and generates two-dimensional mesh data 212.

Figure 3A:
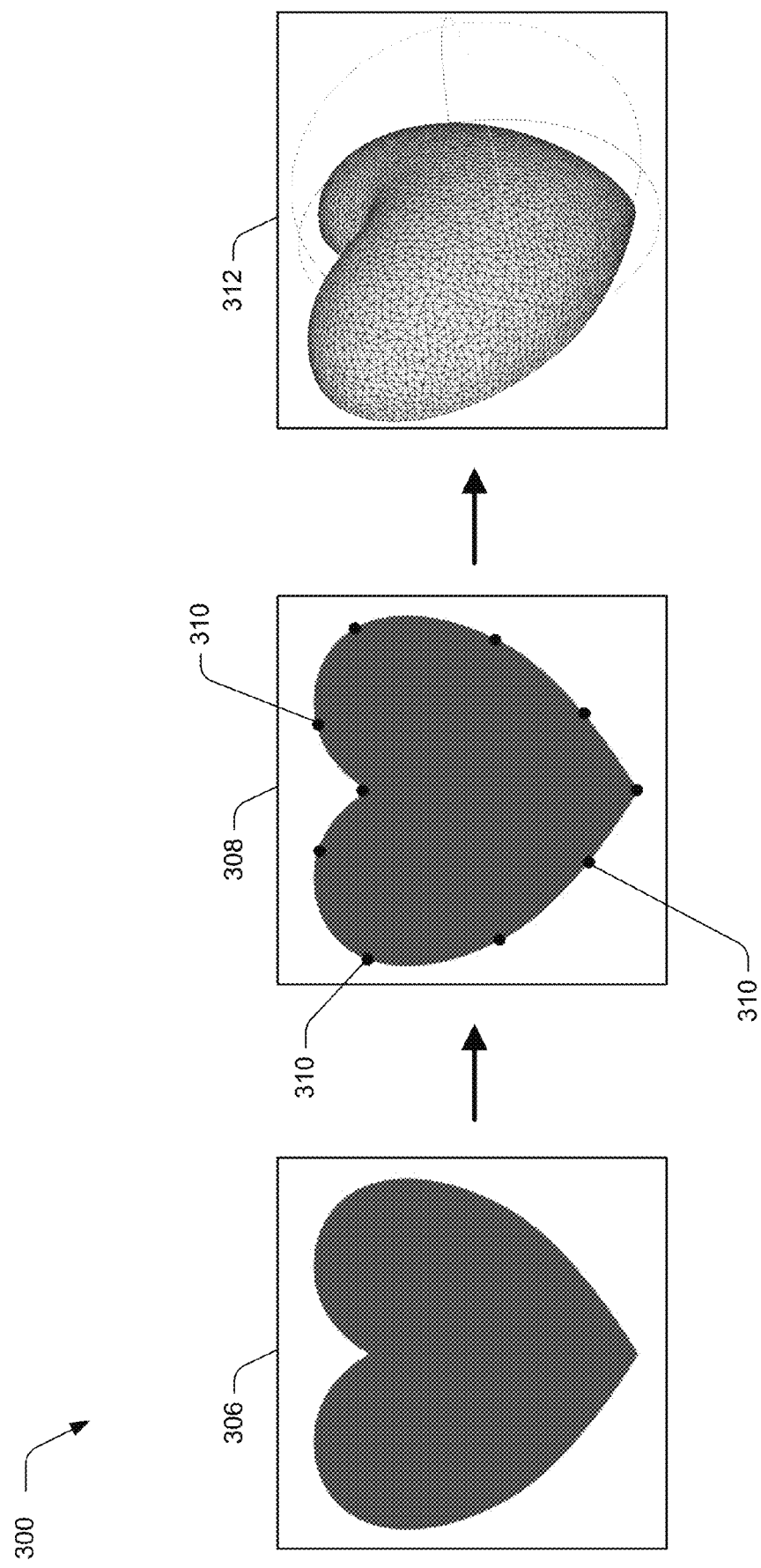

FIGS. 3A, 3B, and 3C illustrate example representations of shading a vector object. FIG. 3A illustrates a representation 300 of generation of a three-dimensional mesh. FIG. 3B illustrates a representation 302 of inclusion of a vector-based object and a shading mesh in a transparency group. FIG. 3C illustrates a representation 304 of generating a shaded vector-based object by blending the vector-based object and the shading mesh.

With reference to FIG. 3A, the two-dimensional mesh module 202 receives the input data 114 which describes a vector-based object 306. As shown in the representation 300, the vector-based object 306 is a heart-shaped vector object. The two-dimensional mesh module 202 processes the input data 114 to identify a boundary of the vector-based object 306, e.g., a boundary of the heart-shaped vector object. For example, the two-dimensional mesh module 202 identifies and discretizes the boundary of the vector-based object 306 which is illustrated in the representation 300 as a sampled boundary 308 including points 310. The two-dimensional mesh module 202 detects the points 310 along the boundary of the vector-based object 306 in one example.

The two-dimensional mesh module 202 forms a two-dimensional mesh based on the points 310. To do so in one example, the two-dimensional mesh module 202 samples the points 310 and uses the points 310 to triangulate an interior of a geometry of the vector-based object 306. For example, the two-dimensional mesh module 202 performs conforming Delaunay triangulation using the points 310 to triangulate the geometry of the vector-based object 306 as part of forming the two-dimensional mesh. In this example, the two-dimensional mesh module 202 generates the two-dimensional mesh as a triangle mesh and constrains a minimum angle of triangles of the triangle mesh such that the triangles do not have an angle less than the minimum angle. In one example, the two-dimensional mesh module 202 constrains the minimum angle to about 15 degrees to ensure quality of the triangle mesh. In other examples, the two-dimensional mesh module 202 constrains the minimum angle to less than 15 degrees or greater than 15 degrees.

The two-dimensional mesh module 202 also ensures spatial smoothness in the triangulated domain $\Omega$. To do so, the two-dimensional mesh module 202 minimizes Laplacian energy by solving a biharmonic equation subject to a condition that values of boundary vertices remain the same. In an example, this is representable as:

$$\Delta^2(X,Y)_i=0$$

where: $x_i$, $y_1$ denotes the position of $i^{th}$ vertex of the triangle mesh in the domain $\Omega$, and the value of the vertices on the boundary of this mesh $\delta\Omega$ is the same as that in the input curve and these are used as boundary conditions for this solve.

The two-dimensional mesh module 202 generates the two-dimensional mesh data 212 as describing the spatially smooth two-dimensional mesh. As shown in FIG. 2, the inflation module 204 receives the two-dimensional mesh data 212 and processes the two-dimensional mesh data 212 to generate three-dimensional mesh data 214. For example, the inflation module 204 inflates the two-dimensional mesh by computing a height field or a z-value for each vertex in the two-dimensional mesh. In one example, the inflation module 204 computes the height field by solving a Laplacian equation subject to Dirichlet boundary conditions. In an example, this is representable as:

$$\Delta Z(X,Y)_i=f$$

subject to $Z|\delta\Omega=0$ where: f corresponds to a magnitude of inflation and is normalized using the XY extent of the two-dimensional triangle mesh and if the input data 114 describes a user specified inflation parameter, then that parameter is multiplied with this value to compute the specified inflation.

The inflation module 204 performs this solve iteratively in one example by subdividing the triangles of the two-dimensional mesh. In this manner, the inflation module 204 ensures a variation of the z-values across vertices of any triangle of the mesh is within a reasonable threshold. For example, this variation facilitates approximations by barycentric interpolation for all interior points. As illustrated in FIG. 3A, the inflation module 204 uses the height field to inflate the two-dimensional mesh and generates a three-dimensional mesh 312. The inflation module 204 generates the three-dimensional mesh data 214 as describing the three-dimensional mesh 312.

The lighting module 206 receives the three-dimensional mesh data 214 and processes the three-dimensional mesh data 214 to generate color value data 216. For example, the lighting module 206 generates the color value data 216 using a light model such a Lambertian model. In an example in which the lighting module 202 leverages the Lambertian model, a ray of light from a light source strikes a point of an object and reflects from the object. If this light reflects in all directions after striking the object, then the light is diffuse light and an amount of light reflected is determined by an angle between the ray of light and a surface normal vector extending from the point. An intensity of light diffusion is representable as:

$$\mathcal{F}_d = K_d(N \cdot L)$$

where: $\mathcal{F}_d$ is the intensity of light diffusion; $L$ refers to the light direction; $N$ refers to a surface normal at the point; and $K_d$ is the diffuse reflection constant that determines an amount of reflectivity of the surface which is equal to one in an example.

The light module 206 uses the intensity of light diffusion $\mathcal{F}_d$ to determine a final color which is representable as:

$$C_R = \mathcal{F}_d * C_L * C_S$$

where: $C_L$ is the light color; $C_S$ is the surface color; and $C_R$ is the final color.

The light module 206 processes the three-dimensional mesh data 214 and computes a normal direction at each vertex of the three-dimensional mesh. In an example in which the light source is orthogonal to a plane containing the geometry of the vector-based object 306, the light module 206 multiplies a unit normal vector at each vertex of the three-dimensional mesh with the light color which is white by default but is customizable by a user. The light module 206 generates the color value data 216 as describing the unit vector at each vertex of the three-dimensional mesh multiplied by the light color.

The shading mesh module 208 receives the color value data 216 and the input data 114 and processes the color value data 216 and/or the input data 114 to generate shading mesh data 218. For example, the shading mesh module 208 processes the color value data 216 and generates a shading mesh 314 which is illustrated in FIG. 3B. To do so, the shading mesh module 208 represents the color value data 216 as a free-form Gouraud-shaded triangle mesh in one example.

In an example, the shading mesh module 208 processes the input data 114 and uses the geometry of the vector-based object 306 as a clipping path to refine a boundary of the shading mesh 314. In this example, the boundary of the shading mesh 314 is not smooth before this refinement because the two-dimensional mesh module 202 discretized the boundary of the vector-based object 306 as the sampled boundary 308 to form the two-dimensional mesh. By using the geometry of the vector-based object 306 as the clipping path, the shading mesh module 208 smooths the boundary of the shading mesh 314 such that this boundary is continuous after the points 310 are removed by the clipping path.

The shading mesh module 208 uses a multiply blend operation in a pre-multiplied color space and uses color $C_r$ as the surface color $C_S$ to generate the final color $C_R$. For example, the equation for multiply blend in the pre-multiplied color space is definable as:

$$C_r = (1.0 - \alpha_b) * C_s + (1.0 - \alpha_s) * C_b + C_s * C_b$$

where: $C_s$ is the source color; $\alpha_s$ is the source alpha; $C_b$ is the backdrop color; and $\alpha_b$ is the backdrop alpha.

The shading mesh module 208 generates the shading mesh data 218 as describing the shading mesh 314. For example, the shading mesh module 208 generates the shading mesh data 218 as describing the shaded mesh 314 having the refined boundary. The blending module 210 receives the shading mesh data 218 and the input data 114 and the blending module 210 processes the shading mesh data 218 and the input data 114 and adds the vector-based object 306 and the shading mesh 314 to a transparency group 316.

As shown in FIG. 3B, blending module 210 uses the transparency group 316 for compositing the vector-based object 306 and the shading mesh 314. For example, the blending module 210 transfers original transparency attributes of the vector-based object 306 (e.g., opacity and blend mode) to the transparency group 316 and resets alpha to 1 for the vector-based object 306. The blending module 210 also sets a blend mode to multiply blend to apply to the vector-based object 306. Thus, the vector-based object 306 and the shading mesh 314 both have alpha set to 1 in the transparency group 316.

In one example, the blending module 210 is implemented to composite the vector-based object 306 and the shading mesh 314. In this example, since $\alpha_s$ and $\alpha_b$ are both equal to 1 as the blending module 210 applies the multiply blend mode to the vector-based object 306, this operation is reduced to a product of source and backdrop colors which yields the output color $C_R$. Additionally, by transferring the original transparency attributes from the vector-based object 306 to the transparency group 316, the blending module 210 ensures that further compositing occurs in a same manner as it would have occurred if the shading effect had not been applied.

The representation 304 depicted in FIG. 3C illustrates the blending module's 210 use of the transparency group 314 to generate a shaded vector-based object 318 by compositing the vector-based object 306 and the shading mesh 314. As shown, the shaded vector-based object 318 includes all properties of a vector object including resolution independence. For example, the shaded vector-based object 318 is represented as points, lines, and/or curves and is scalable without aliasing unlike a raster-based object that is represented as an array of pixels. In this example, the shaded vector-based object 318 is viewable in any PDF rendering application such that the shaded vector-based object 318 is useable in both digital and print workflows.

In an example in which the shading module 110 is implemented to generate multiple shaded vector-based objects from a group including multiple objects arranged in a z-order, the shading module 110 traverses this group in reverse z-order (e.g., bottom to top). The shading module 110 generates a shading mesh for each object in the group as described above and adds each object and corresponding shading mesh to a new group (e.g., a subgroup of the transparency group or a new transparency group). The shading module 110 then applies the multiply blend mode to the object in the new group. The shading module 110 repeats this process for each object of the multiple objects.

The shading module 110 is capable of receiving a vector object as an input and generating a shaded vector object as an output without any additional user inputs or manual annotations. Although not needed, the shading module 110 is also capable of receiving user inputs to customize parameters used to generate shaded vector objects such as a magnitude of inflation, strengths of ambient and diffuse components of light, and a color of the light. For example, an inflated three-dimensional surface used to generate a shading mesh is also usable for performing other three-dimensional operations such as texture mapping for vector objects.

Consider an example in which the input data 114 describes a raster-based object instead of a vector-based object as previously described. In this example, the shading module 110 converts the raster-based object into a 2-color bitmap and computes Laplacian inflation for all pixels inside of the raster-based object. The shading module 110 leverages a pixel grid as a two-dimensional matrix for computing Laplacian and bi-Laplacian matrices. The shading module 110 generates a shading construct which is a grayscale raster-based object. The shading module 110 then composites the raster-based object and the shading construct using the multiply blend mode as described above to generate a shaded raster-based object.

In some examples, the shading module 110 is not limited to generating shaded objects by inflating a two-dimensional mesh or leveraging the pixel grid as the two-dimensional matrix. In these examples, the shading module 110 is capable of generating a shaded object using any normal map usable to represent a two-dimensional input object in three dimensions. For example, the input data 114 describes other normal maps such as normal maps specified by a user input for projecting a two-dimensional input into a three-dimensional representation. In one example, the shading module 110 uses z-values obtainable in the blue channel (e.g., the blue RGB channel) which are converted to a grayscale shading raster. This grayscale shading raster is then composited with an input object to generate a shaded object.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which a three-dimensional mesh is generated by inflating a two-dimensional mesh and color values are applied to a shading mesh based on locations of vertices of the three-dimensional mesh.

Points are detected along a boundary of a vector-based object (block 402). For example, the computing device 102 implements the shading module 110 to detect the points along the boundary of the vector-based object. In another example, the shading module 110 samples the points along the boundary of the vector-based object. A two-dimensional mesh is formed based on the detected points (block 404). The shading module 110 forms the two-dimensional mesh based on the detected points in one example.

A geometry of the vector-based object is determined (block 406). In some examples, the shading module 110 determines the geometry of the vector-based object. A three-dimensional mesh is generated by inflating the two-dimensional mesh based on the geometry of the vector-based object (block 408). For example, the computing device 102 implements the shading module 110 to generate the three-dimensional mesh. Color values are applied to a shading mesh based on locations of vertices of the three-dimensional mesh (block 410). In an example, the shading module 110 applies the color values to the shading mesh.

Figure 5:
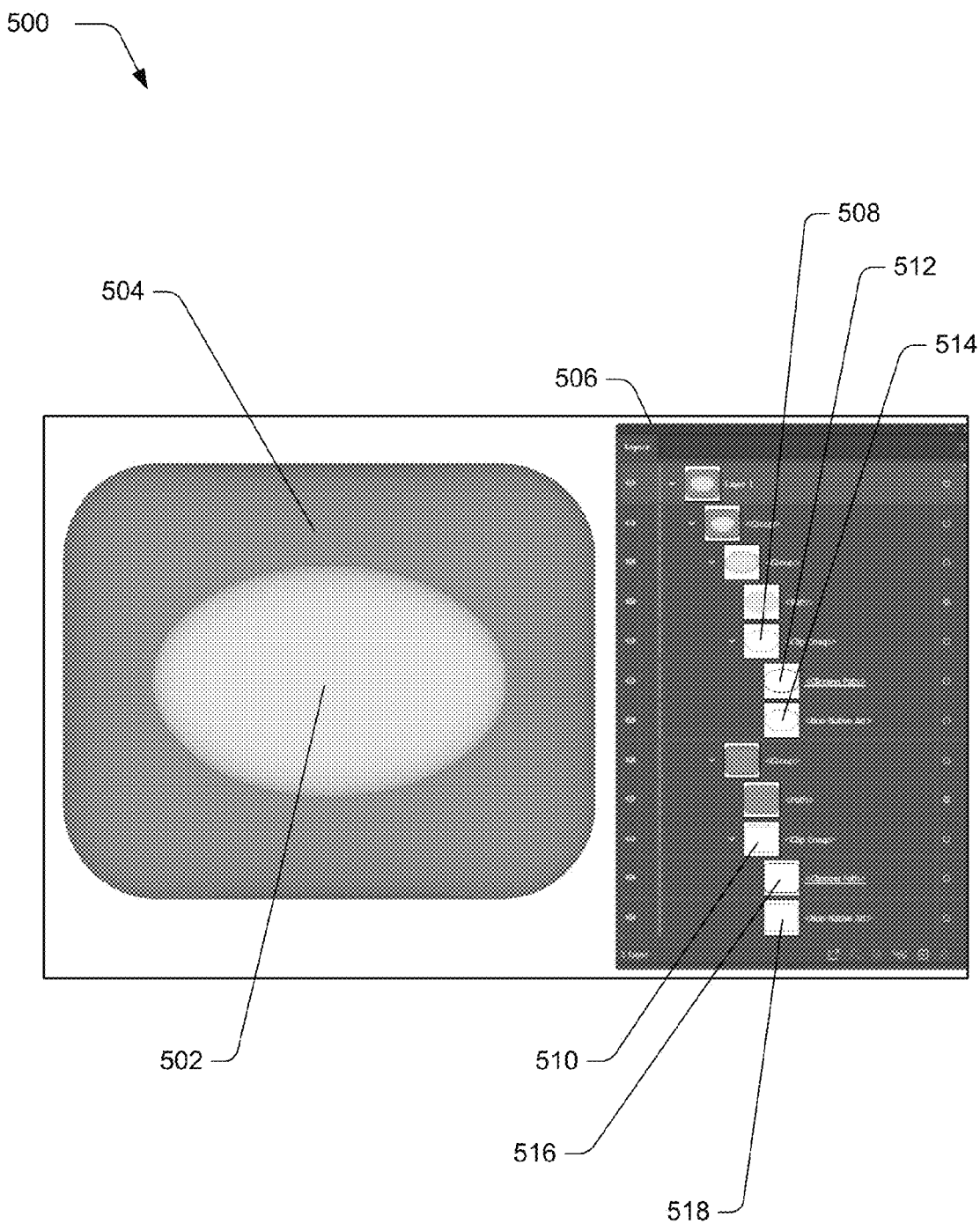
FIG. 5 illustrates an example representation of clipping paths used to refine boundaries of shading meshes for a group of multiple objects.

FIG. 5 illustrates an example representation 500 of clipping paths used to refine boundaries of shading meshes for a group of multiple objects. The representation 500 includes a first object 502 and a second object 504 of the group of objects. As shown, the first object 502 is an oval shape and the second object 504 is a rounded rectangle. The first object 502 is a foreground object relative to the second object 504. Accordingly, the second object 504 is a background object relative to the first object 502.

The representation 500 also includes a clipping group workflow 506 which is illustrated to include a first clipping group 508 and a second clipping group 510. As shown, the first clipping group 508 corresponds to the first object 502 and the second clipping group 510 corresponds to the second object 504. The first clipping group 508 is depicted as including a clipping path 512 which is an outline or a boundary of the first object 502. The first clipping group 508 is also depicted to include a shading mesh 514 which is generated based on an inflated two-dimensional mesh formed using points sampled along a boundary of the first object 502.

The second clipping group 510 includes a clipping path 516 and a shading mesh 518 generated based on the second object 504. For example, the shading module 110 samples points along a boundary of the second object 504 and uses these points to form a two-dimensional mesh by triangulating an interior of the boundary. In one example, the shading module 110 inflates this two-dimensional mesh as a three-dimensional mesh which is usable by the shading module 110 to generate the shading mesh 518. The shading module 110 refines a boundary of the shading mesh 518 by applying a geometry of the second object 504 as the clipping path 516 which smooths the shading mesh's 518 boundary in another example.

Figure 6:
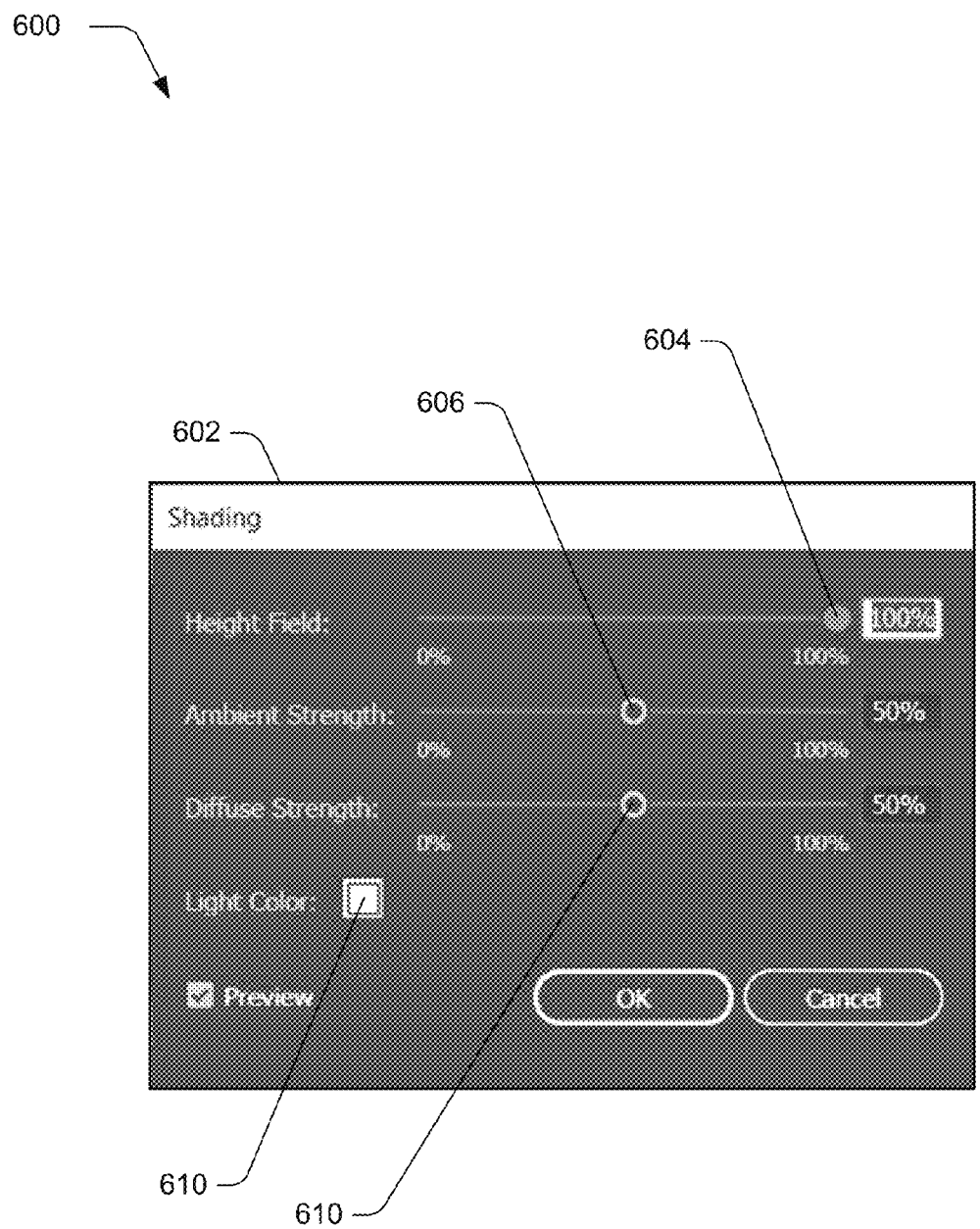
FIG. 6 illustrates an example representation of a user interface for modifying parameters used to shade vector objects.

FIG. 6 illustrates an example representation 600 of a user interface 602 for modifying parameters used to shade vector objects. The user interface 602 includes user interface elements 604-610. For example, a user interacts with an input device such as a mouse or a stylus (e.g., relative to the user interface 120 of the display device 106) and indications of this user interaction are included in the input data 114. If the input data 114 describes a user interaction with a first user interface element 604, then the computing device 102 implements the shading module 110 to adjust the height field by adjusting the inflation parameter described with respect to FIG. 2. Increasing the height field generally increases the z-values for the vertices and decreasing the height field generally decreases the z-values.

If the input data 114 describes a user interaction with a second user interface element 606, then the shading module 110 adjusts an ambient strength of light used to generate the color value data 216. In an example in which the input data 114 describes a user interaction with a third user interface element 608, the shading module 110 processes the input data 114 and adjusts a diffuse strength of light used to determine the color values described by the color value data 216. Finally, if the input data 114 describes a user interaction with a fourth user interface element 610, then the shading module 110 modifies a color of light used to generate the color value data 216 which is white by default.

Figure 7A:
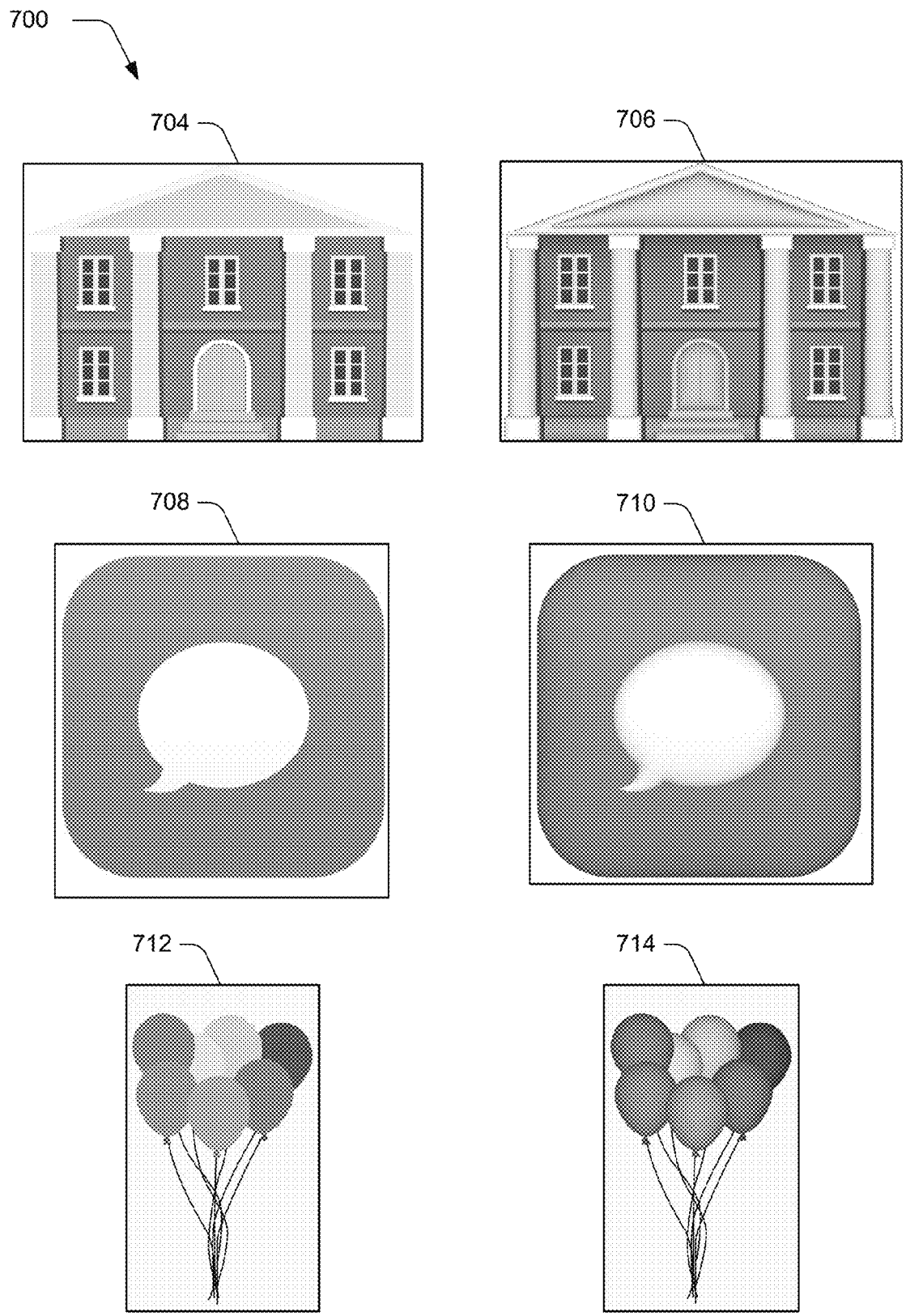
FIGS. 7A and 7B illustrate example representations of input objects and shaded objects.
Figure 7B:
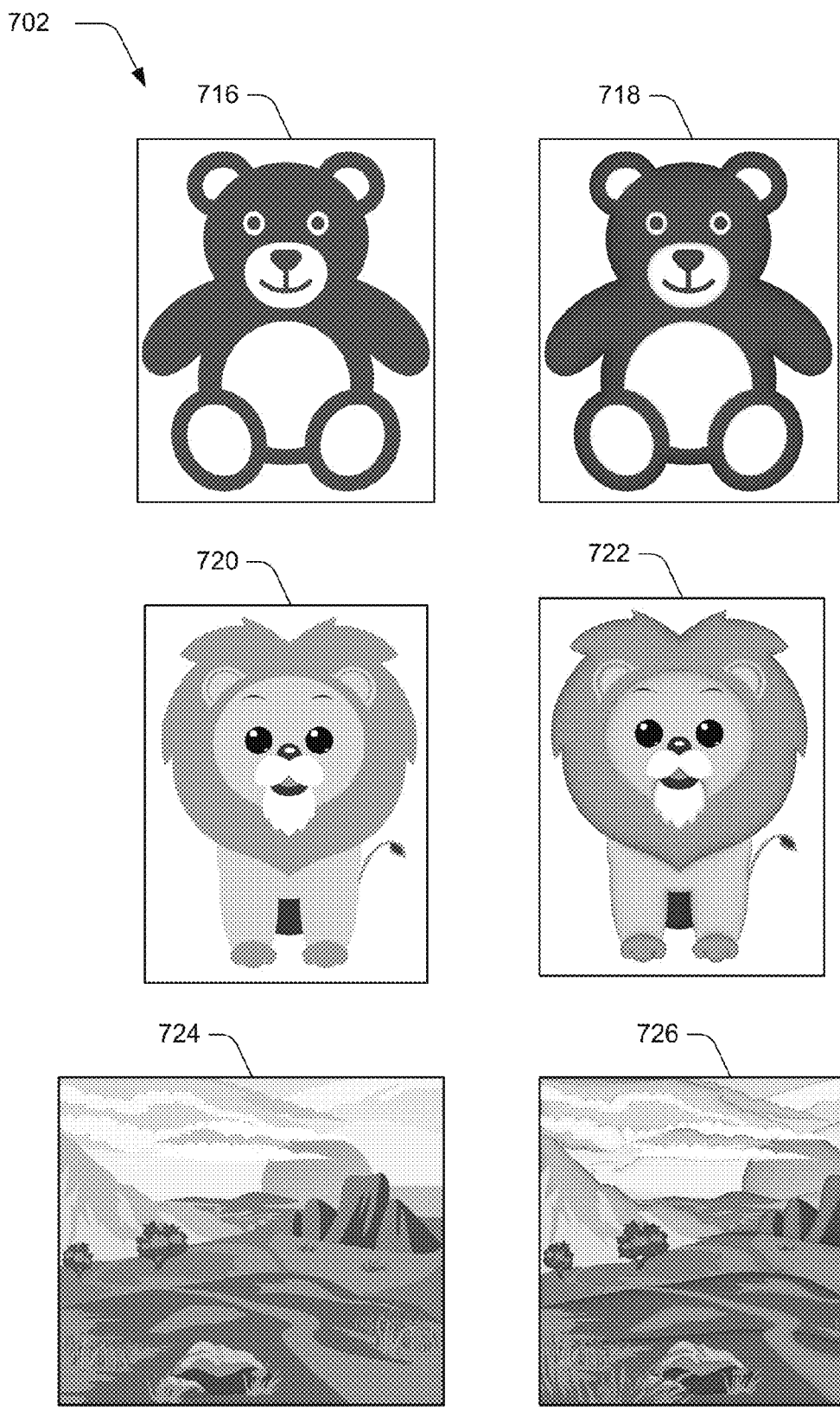

FIGS. 7A and 7B illustrate example representations 700, 702 of input objects and shaded objects. As shown in FIG. 7A, the representation 700 includes an input object 704 and a shaded object 706. In one example, the input object 704 is a vector object and the shaded object 706 is also a vector object. In another example, the input object 704 is a raster object and the shaded object 706 is also a raster object. For example, the shading module 110 receives the input data 114 describing the input object 704 which is a home or a building and the shading module 110 generates the shaded object 706. As compared to the input object 704, the shaded object 706 has an improved visual appearance.

The representation 700 also includes an input object 708 which depicts a speech bubble or balloon and a shaded object 710 which is more aesthetically pleasing than the input object 708. Finally, the representation 700 includes an input object 712 which is a group of balloons and a shaded object 714. For example, the shading module 110 receives the input data 114 describing the input object 712 and the shading module 110 generates the shaded object 714.

As illustrated in FIG. 7B, the representation 702 includes an input object 716 which is a teddy bear and a shaded object 718 which is a shaded teddy bear. As shown, the shaded object 718 has an improved visual appearance relative to the input object 716. The shading module 110 receives the input data 114 describing the input object 716 which is a vector object or a raster object, and the shading module 110 generates the shaded object 718 which is a vector object or a raster object.

The representation 720 also includes an input object 720 which depicts a lion and a shaded object 722 which depicts a shaded lion. An input object 724 depicts a scenic view of a landscape and a shaded object 726 depicts the scenic view of the landscape with an improved visual appearance. For example, the shading module 110 receives the input data 114 which describes the input object 724 and the shading module 110 processes the input data 114 to generate the shaded object 726.

Example System and Device

Figure 8:
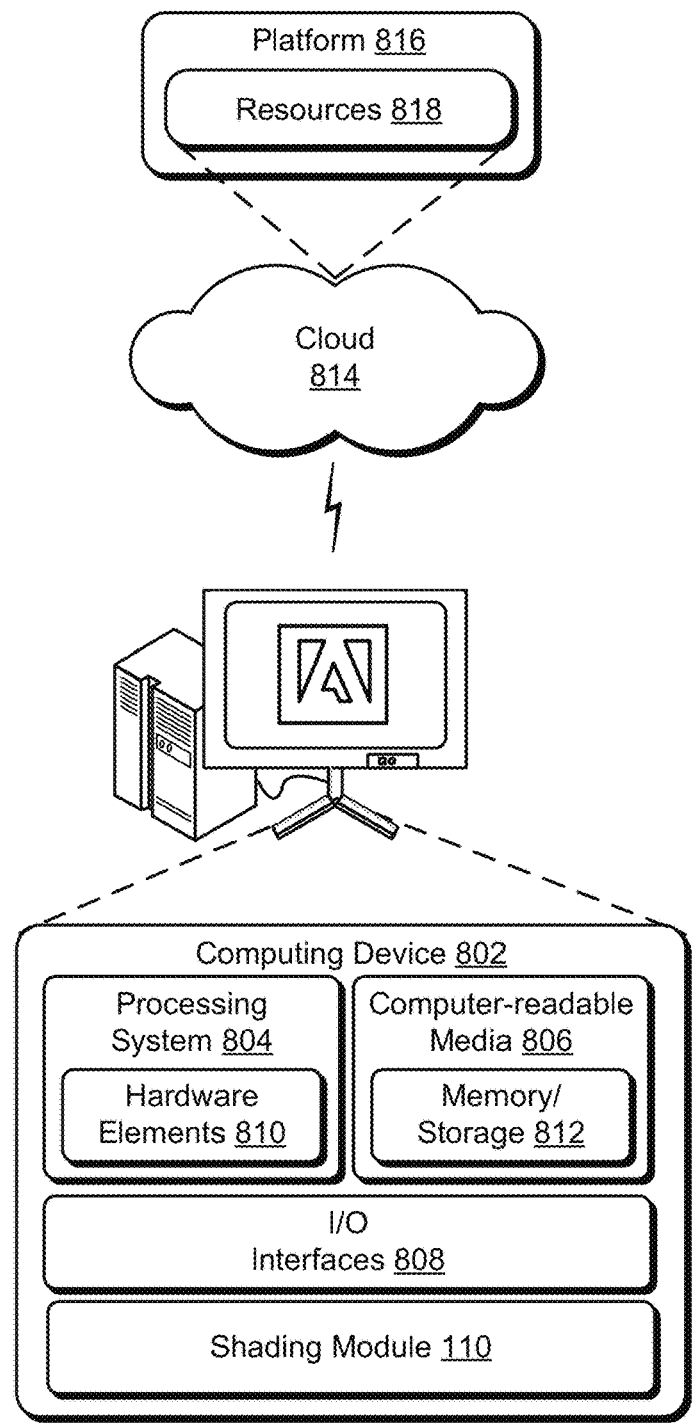
FIG. 8 illustrates an example system that includes an example computing device that is representative of one or more computing systems and/or devices for implementing the various techniques described herein.

FIG. 8 illustrates an example system 800 that includes an example computing device that is representative of one or more computing systems and/or devices that are usable to implement the various techniques described herein. This is illustrated through inclusion of the shading module 110. The computing device 802 includes, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that are be configured as processors, functional blocks, and so forth. This includes example implementations in hardware as an application specific integrated circuit or other logic device formed using one or more semiconductors. The hardware elements 810 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 806 is illustrated as including memory/storage 812. The memory/storage 812 represents memory/storage capacity associated with one or more computer-readable media. In one example, the memory/storage component 812 includes volatile media (such as random access memory (RAM)) and/or nonvolatile media (such as read only memory (ROM), Flash memory, optical disks, magnetic disks, and so forth). In another example, the memory/storage component 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 810. For example, the computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supportable by various configurations of the computing device 802 and are not limited to the specific examples of the techniques described herein. This functionality is also implementable entirely or partially through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. For example, the resources 818 include applications and/or data that are utilized while computer processing is executed on servers that are remote from the computing device 802. In some examples, the resources 818 also include services provided over the Internet and/or through a subscriber network, such as a cellular or Wi-Fi network.

The platform 816 abstracts the resources 818 and functions to connect the computing device 802 with other computing devices. In some examples, the platform 816 also serves to abstract scaling of resources to provide a corresponding level of scale to encountered demand for the resources that are implemented via the platform. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although implementations of systems for shading vector objects have been described in language specific to structural features and/or methods, it is to be understood that the appended claims are not necessarily limited to the specific features or methods described. Rather, the specific features and methods are disclosed as example implementations of systems for shading vector objects, and other equivalent features and methods are intended to be within the scope of the appended claims. Further, various different examples are described and it is to be appreciated that each described example is implementable independently or in connection with one or more other described examples.

What is claimed is:

1. In a digital medium vector object shading environment, a method implemented by a computing device, the method comprising:
    detecting, by the computing device, points along a boundary of a vector-based object;
    forming, by the computing device, a two-dimensional mesh based on the detected points;
    determining, by the computing device, a geometry of the vector-based object;
    generating, by the computing device, a three-dimensional mesh by inflating the two-dimensional mesh based on the geometry of the vector-based object and multiplying a height value of a vertex of the two-dimensional mesh and a magnitude of inflation; and
    applying, by the computing device, color values to a shading mesh based on locations of vertices of the three-dimensional mesh.

2. The method as described in claim 1, further comprising generating, for display in user interface, a shaded vector-based object by blending the vector-based object and the shading mesh.

3. The method as described in claim 2, wherein the shaded vector-based object is resolution independent.

4. The method as described in claim 2, wherein generating the shaded vector-based object includes compositing the vector-based object and the shading mesh using a multiply blending operation.

5. The method as described in claim 1, wherein the color values are determined using Lambert's cosine law.

6. The method as described in claim 1, further comprising refining a boundary of the shading mesh using the geometry of the vector-based object as a clipping path.

7. The method as described in claim 1, wherein generating the two-dimensional mesh includes connecting the points of the boundary with line segments and performing conforming Delaunay triangulation to triangulate the geometry of the vector-based object.

8. The method as described in claim 1, further comprising receiving a user input defining the magnitude of inflation.

9. The method as described in claim 1, further comprising:
receiving a user input defining at least one of a color of light, an ambient strength of the light, or a diffusion strength of the light; and
generating the shaded mesh based at least partially on the user input.

10. The method as described in claim 1, wherein the shading mesh is a free-form Gouraud-shaded triangle mesh.

11. In a digital medium vector object shading environment, a system comprising:
a two-dimensional mesh module implemented at least partially in hardware of a computing device to:
detect points along a boundary of a vector-based object; and
form a two-dimensional mesh based on the detected points;
an inflation module implemented at least partially in the hardware of the computing device to:
determine a geometry of the vector-based object; and
generate a three-dimensional mesh by inflating the two-dimensional mesh based on the geometry of the vector-based object and multiplying a height value of a vertex of the two-dimensional mesh and a magnitude of inflation;
a lighting module implemented at least partially in the hardware of the computing device to determine color values based on locations of vertices of the three-dimensional mesh; and
a shading mesh module implemented at least partially in the hardware of the computing device to generate a shading mesh having the determined color values.

12. The system as described in claim 11, further comprising a blending module implemented at least partially in the hardware of the computing device to generate a shaded vector-based object by compositing the vector-based object and the shading mesh using a multiply blending operation.

13. The system as described in claim 12, wherein the shaded vector-based object is resolution independent.

14. The system as described in claim 11, wherein the shading mesh module is further implemented to refine a boundary of the shading mesh using the geometry of the vector-based object as a clipping path.

15. The system as described in claim 11, further comprising a blending module implemented at least partially in the hardware of the computing device to:
generate a transparency group including the vector-based object, the shading mesh, and transparency attributes of the vector-based object; and
generate a shaded vector-based object by compositing the transparency group, the shaded vector-based object including the transparency attributes of the vector-based object.

16. One or more computer-readable storage media comprising instructions stored thereon that, responsive to execution by a computing device, causes the computing device to perform operations including:
detecting points along a boundary of a vector-based object;
forming a two-dimensional mesh based on the detected points;
generating a three-dimensional mesh by inflating the two-dimensional mesh based on a geometry of the vector-based object and multiplying a height value of a vertex of the two-dimensional mesh and a magnitude of inflation;
determining color values based on locations of vertices of the three-dimensional mesh; and
generating a shading mesh using the determined color values.

17. The one or more computer-readable storage media as described in claim 16, wherein the operations further include generating a shaded vector-based object by compositing the vector-based object and the shading mesh using a multiply blending operation.

18. The one or more computer-readable storage media as described in claim 16, wherein the operations further include:
generating a transparency group including the vector-based object, the shading mesh, and transparency attributes of the vector-based object; and
generating a shaded vector-based object by compositing the transparency group, the shaded vector-based object including the transparency attributes of the vector-based object.

19. The one or more computer-readable storage media as described in claim 16, wherein the shading mesh is a free-form Gouraud-shaded triangle mesh.

20. The one or more computer-readable storage media as described in claim 16, the operations further include refining a boundary of the shading mesh using the geometry of the vector-based object as a clipping path.

\* \* \* \* \*